Nov. 7, 1961   R. R. PECORARO ET AL   3,007,392
CANISTER FOR PRODUCING BEVERAGES

Filed Feb. 26, 1959   2 Sheets-Sheet 1

INVENTOR.
RALPH R. PECORARO
ANGELO S. SINATRA
BY
*Jerome Bauer*
ATTORNEY.

INVENTOR.
RALPH R. PECORARO
ANGELO S. SINATRA
BY
*Jerome Dauer*
ATTORNEY

United States Patent Office 3,007,392
Patented Nov. 7, 1961

3,007,392
CANISTER FOR PRODUCING BEVERAGES
Ralph R. Pecoraro, West Islip, and Angelo S. Sinatra, Massapequa Park, N.Y., assignors to Ref Manufacturing Corporation, Mineola, N.Y., a corporation of New York
Filed Feb. 26, 1959, Ser. No. 795,626
6 Claims. (Cl. 99—307)

This invention relates to the production of a desired beverage by infusing a fluid with a beverage ingredient. To this end the invention is more particularly concerned with a method and canister apparatus for producing the beverage.

Accordingly, objects of this invention reside in providing a unique method and novel apparatus for producing a beverage by forcing fluid through a desired beverage producing ingredient. In carrying forth the objects an important feature thereof resides in the provision of a novel canister apparatus that is unusually compact and shallow in height, requiring very little space for its accommodation, so simple in structure that an unskilled technician may utilize the same efficiently with the same predictable results during each operation, and so unique in operation that the desired beverage producing ingredient is thoroughly leached to result in a filtered evenly infused beverage.

Other and further objects of our invention reside in the structures and arrangements hereinafter more fully described with reference to the accompanying drawings in which.

Figure 1:
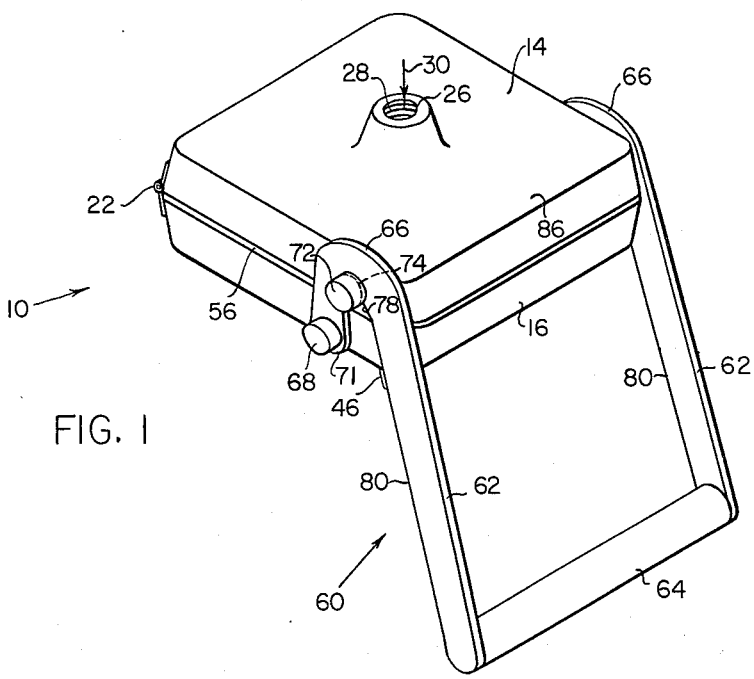
FIG. 1 is a perspective view of the canister shown in its closed locked condition and constructed in accordance with the teaching of the invention.
Figure 3:
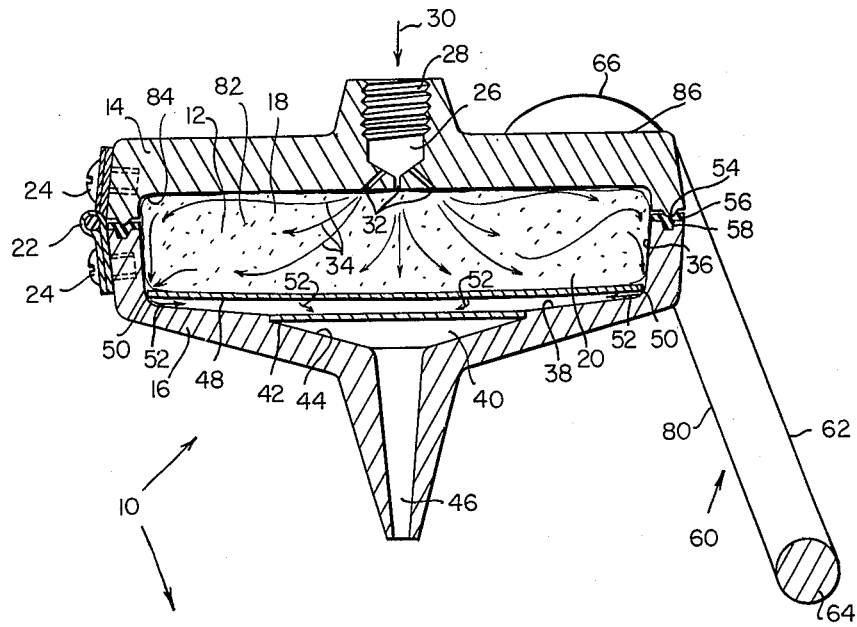
FIG. 3 is a sectional view of the side of the canister showing its manner of operation.

Referring now to the drawings, the canister apparatus for producing a desired beverage is generally identified by the numeral 10. Basically the canister 10 includes a beverage infusion chamber 12 that is defined between a top member 14 and a bottom member 16, when the can is closed as shown in FIGS. 1 and 3.

Both the top and bottom members 14 and 16 are substantially square in shape and shallow in height. They are designed for complementary positioning to define the canister chamber 12 therebetween. To this end, top member 14 is provided with a cavity 18 while bottom member 16 is provided with a cavity 20. When the top and bottom members are closed as shown in FIGS. 1 and 3, their respective cavities 18 and 20 are aligned with each other to complete the chamber 12.

Figure 2:
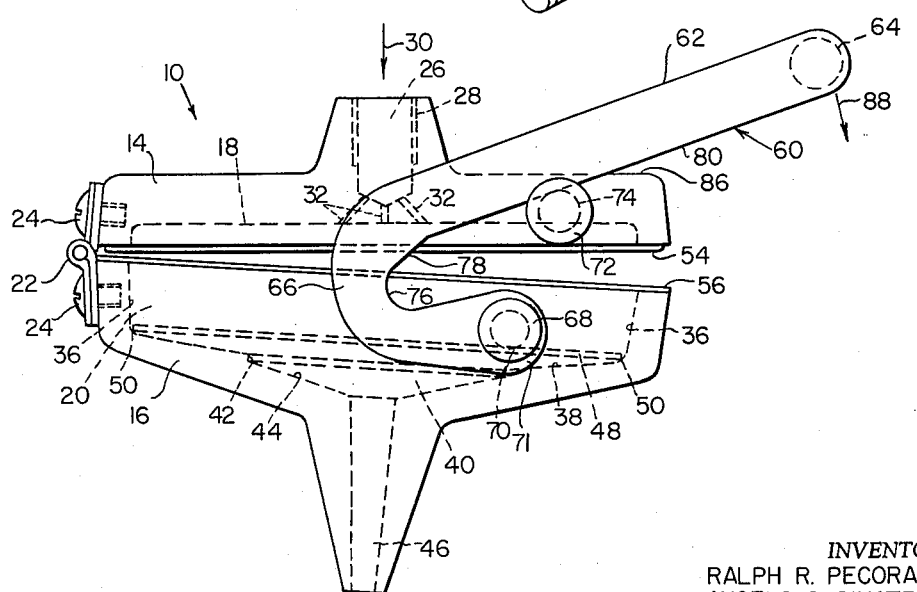
FIG. 2 is a side view of the canister shown in a partially open condition.

A hinge structure 22 is suitably fastened by screws 24 passing through openings 25 for threaded engagement with the aft portions of the top and bottom members and serves to secure the members together for relative pivotal movement. Centered in the top member 14 is an inlet means 26 that is provided with an internal thread 28. The thread 28 threadingly engages with a conduit, not shown, to connect the inlet with a source of fluid under pressure. Arrow 30 shown in FIGS. 1, 2 and 3 diagrammatically depicts the direction of movement of the pressurized fluid that is conducted to the inlet 26.

Fluid inlet 26 terminates immediately short of the cavity 18 of the top member 14. However, communication between the inlet 26 and the chamber 12 is afforded by a plurality of fluid inlet openings or nozzles 32. Each nozzle 32 is angularly directed away from the terminal end of the inlet 26 to emit a fine stream of fluid. The combined plurality of fine streams evenly and uniformly spread the inlet fluid in spray formation into the chamber 12.

Those skilled in the art will recognize that each of the spray nozzles 32 is smaller in diameter than that of the inlet 26. Accordingly, the fluid entering inlet 26 under pressure is caused to move rapidly through each of the nozzles 32 into the chamber 12. Hence, as the fluid under pressure exits from the nozzles into the chamber it does so in a fine spray that is dispersed evenly in all directions. Referring to FIG. 3, there is shown a plurality of lines, only certain of which are numbered, that attempt to diagrammatically depict the paths of movement of the inlet fluid as the same exits from the ends of nozzles 32 into the chamber 12 and to display the paths of movement of the dispersed fluid through the chamber.

Cavity 20 is defined in four upper side walls 36 that slope slightly inward and downward. Shallow sloped surfaces 38 comprise integral extensions of the walls 36 and terminate in a catch basin 40. The catch basin 40 is defined by four walls 42 and further sloping surfaces 44 truncated to terminate in a downwardly disposed fluid outlet means 46. The outlet 46 serves to exhaust the fluid from the chamber 12.

Figure 4:
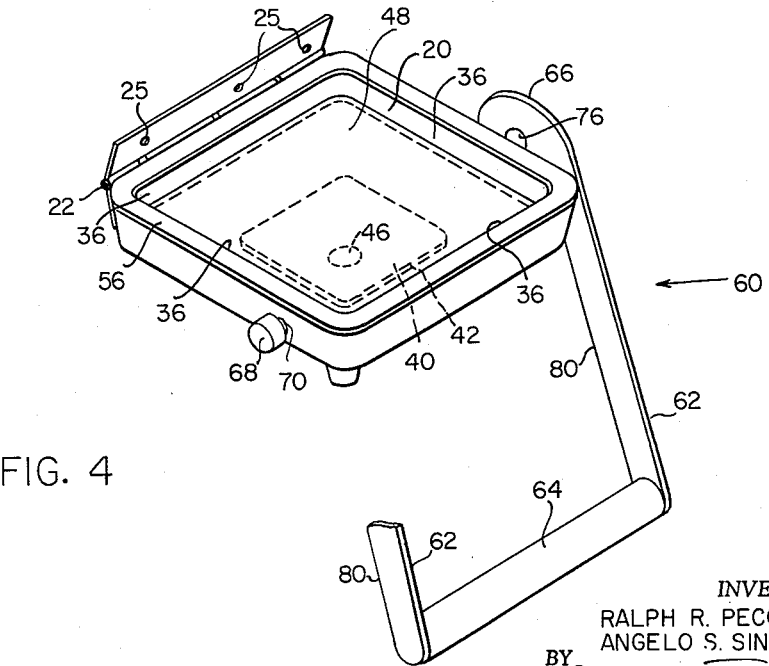
FIG. 4 is a top view of the bottom member with a portion of one of the locking arms removed.

Mounted within the cavity 20 at the lower portion of the canister chamber 12 is an imperforate surface plate member 48. The plate member is substantially square in shape, slightly rounded at its corners to seat neatly within the cavity 20 of the bottom member 16 as shown in FIGS. 2, 3 and 4 at the corner wherein the walls 36 and 38 meet. Thus the walls that define the chamber 12 serve also to provide a seat for the plate member 48.

Plate member 48 may be constructed preferably of stainless steel or aluminum to prevent corrosion during its constant use with eroding fluids. The plate 48 is substantially flat and therefore normally would provide an imperforate engagement with the defining walls of the chamber 12. However, in the instant invention the top and bottom members 14 and 16 may be cast of any suitable non-corrosion material. As such the casting has a slightly irregular surface that is almost imperceptibly stippled or wrinkled.

Thus, when the plate member 48 rests on the almost imperceptibly irregular surfaces of the defining walls of the chamber 12 it cooperates or coacts with such walls in a manner as to define or result in the provision of innumerable seepage passageways of minute size. These passageways are formed at the point of seating contact as indicated by the numeral 50, see FIGS. 2 and 3. Because of their minute or small size the passageways 50 permit the fluid introduced into the chamber 12 to seep therefrom along the surfaces 38 into the catch basin 40 and thus out of the canister by way of the outlet 46.

The manner of seepage is attempted to be diagrammatically depicted by the arrows 52 (FIG. 3). The seepage mentioned herein is a constant oozing effect through the porous-like structure about all sides of the seated plate member 48, whereby the fluid introduced under pressure in the chamber 12, by way of the inlet 26, is caused to seek its way out of the chamber through the minute passageways 50.

The chamber 12 defined between the top and bottom members 14 and 16 is fluid tightly sealed when such members are in their closed position as shown in FIGS. 1 and 3. The fluid tight seal occurs between a rim or peripheral downwardly extending boss 54 provided on the undersurface of the periphery of the top member 14 for engagement with a yieldable seal 56. The seal 56 is seated in a peripheral groove 58 (FIG. 3) provided in the upper wall of the bottom member 16. Hence, when the top member is moved relative to the bottom member 16 to close against the same as shown in FIGS.

1 and 3, its peripheral boss 54 impresses into the peripheral seal 56 of the bottom member to provide a fluid-tight seal about the chamber 12.

All during the time that the top and bottom members 14 and 16 are secured in their closed position the chamber 12 is fully sealed. Hence, fluid entering into the same by way of the inlet 26 must eventually exhaust therefrom by way of the outlet 46. In order to move or operate the top and bottom members 14 and 16 relative to each other, there is provided an operative locking device generally identified by the numeral 60.

Locking device 60 comprises a pair of planar arms 62 arranged in parallel relationship. The arms 62 are secured together for conjoint movement by a joining or linking handle 64. Both arms 62 are exactly alike in structure, therefore, a description of one will suffice for the two. The arm 62 may be said to be cane-shape being curved at its top 66 and then directed downward again to terminate for pivotal movement about the pivot 68 secured in the outer surface of the bottom member 16.

The pivot 68 has a narrowed shank 70 (FIG. 4) about which the terminal pivoted end 71 of the lock arm 62 operates. A locking means or pin 72 is secured in the outer surfaces of the top member 14 for engagement by each one of the locking arms 62. Each of such pins is provided with a locking surface 74 about which the arms 62 must engage and slide upon.

Pivots 68, provided on opposite sides of the outer surfaces of the bottom member 16, are in vertical planar and parallel relationship with the locking pins 72 secured in the opposed outer surfaces of the top member 14. Hence, it may be said that the locking pins 72 are offset in planar relationship with respect to the pivots 68. This offset relationship will be more clearly understood as the description proceeds.

Lock arms 62 are provided with recesses 76 (see FIG. 2). The recesses 76 are shaped for complementary engagement with the locking surfaces 74 defined on the pin 72. Just prior to the entrance of the recess 76 is a pressure applying structure in the form of a slightly angled or inclined surface 78 that forms a continuation of a runner surface 80, formed along the undersurface or edge of the arms 62.

In actual practice a beverage producing ingredient, as coffee grounds 82, is contained within a fine mesh filter bag 84 as shown in FIG. 3. The filter bag is substantially of the same size and shape as the interior of the chamber 12 to fit neatly therewithin to coincide with and hug the defining walls of the chamber when wet by the fluid introduced into the chamber.

In order to place the container 84, having the beverage producing ingredient 82 therein into the chamber 12, the top and bottom members 14 and 16 are caused to move relative to each other to provide an access opening into the chamber. Under normal conditions of operation the top member 14 is secured at the threads 28 to a stationary fluid pressure conduit, as exemplified by the arrow 30. In consequence, the top member 14 is normally retained immovable in the related apparatus of which it may form a part.

Hence, when the locking arms 62 are conjointly actuated by the handle 64 about their pivots 68, the recesses 76 are moved out of engagement with the locking surfaces 74 on the locking means 72. The normal weight of the bottom member 16 causes the same to move in a pivotal direction about the hinge 22 thereby separating its seal 56 from engagement with the boss 54 on the top member. This manner of movement of the bottom member relative to the top member is more clearly shown in FIG. 2.

Once the recesses 76 are disengaged from the locking surfaces 74, the handle 64 may be manually released and the weight of the bottom member 16 will drag with it the locking arms 62, causing the same to bear at 80 against, and to run along the locking surface 74. The degree of relative movement or relative separation of the top and bottom members 14 and 16 is controlled and limited by the joining handle 64 that eventually abuts against the very top surface 86 of the top member 14.

Thus, the top and bottom members are permitted relative but limited movement. The distance of such relative movement may be predetermined by the length of the runners 80 and by the amount of room necessary for the insertion and/or removal of the beverage producing ingredient container 84 into or from the chamber 12.

After the initial insertion of the filter container 84 into the chamber 12, the handle 64, assumedly resting upon the top surface 86, is now manually grasped and pulled down in the direction of the arrow 88 shown in FIG. 2. During such downward movement the runner surfaces 80 engage and apply a downward pressure against the locking surface 74 thereby applying a resultant upward force to the pivot pins 68 on the bottom member. This resultant upward force causes the bottom member 16 to move up toward closing engagement with the top member 14.

Continued downward manual movement applied in the direction of the arrow 88 brings the pressure applying surface structure 78 into engagement with the locking surface 74 to transmit thereagainst a radially directed force that is applied along different portions of the locking surface. In consequence, there is a resultant lifting force on the pivot 68 of the bottom member 16. These forces move the locking pins 72 and pivots 68 toward each other to bring their respective member into tighter closing engagement.

During this movement the boss 54 presses into the deformable seal 56 to provide a water-tight engagement therewith, while the recess 76 moves into tight cooperative engagement with the locking surface 74. It is to be noted that the pressure applying structure 78 cooperates with the recess 76 so that the surface 78 lies in a plane inclined with respect to the vertical when the locking device is in its fully locked position as shown in FIG. 1. The inclined planar position of the surface 78 prevents possible undesired disengagement of the recess 76 from about the locking surface 74 and requires the actual manual application of upward force to the locking handle 64 to cause the surface 78 to traverse the locking surface 74.

Fluid under pressure is introduced into the chamber 12 of the canister by way of inlet 26 in the direction of the arrow 30. As the fluid is forced through the smaller nozzles 32 it spreads and disperses in all directions to penetrate downward through the filter container 84. This is shown by lines 34. The continued downward penetration of the fluid through the ingredient 82 is subsequently obstructed by the imperforate plate 48 on which the ingredient rests. Plate 48 thus divides and separates the outlet 46 from the main portion of the chamber 12 to laterally divert and reverse the downward flow of incoming fluid.

This diversion of the incoming fluid turbulently leaches through the ingredient 82 to become completely infused therewith. In the meanwhile the continued introduction of fluid under pressure through the inlet 26 forces the already infused fluid to move outward through the side and bottom filter openings of the container 84. This results in forcefully filtering the infused fluid to remove therefrom all particles of leached ingredient.

The constant pressure of the inlet fluid causes the infused fluid to follow the path of least resistance whereby the same seeps out of the chamber 12 through the minute passageways 50 along the surfaces 38. This seepage from the chamber to the outlet 46 is depicted by the lines 52 (FIG. 3). It will be understood that because the passageways 50 are so minute in size they restrict the exhaust of infused fluid to a rate that is slower than that at which the fluid is introduced into the chamber. Hence, the fluid within the chamber is constantly under pressure and turbulently leaches the ingredient as it penetrates the same.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

We claim:

1. A canister having a space in which a container of beverage producing ingredients is adapted to be received, said canister comprising top and bottom members movable from an open to a closed position, said members having cavities defining said container receiving space therebetween when in said closed position, fluid inlet means communicating with said space to introduce fluid thereinto, fluid outlet means in said bottom member communicating with said space to exhaust fluid therefrom, imperforate means in said bottom cavity and cooperatively engaging said bottom member to provide a plurality of passageways therebetween through which the combined rate of flow of fluid to said fluid outlet means is slower than that at which fluid enters said space at said fluid inlet means, and lock means on each of said members cooperable to lock the same closed, said lock means on one of said members including means to limit the relative opening movement of said members.

2. In a canister having a plurality of members, means securing said members together for relative movement between open and closed positions, a cavity defined in at least one of said members, a fluid inlet in one of said members communicating with said cavity to introduce fluid thereinto, a fluid outlet in the other of said members communicating with said cavity to exhaust fluid therefrom, imperforate means in one of said members cooperable therewith to define a plurality of fluid outlet openings therebetween through which the combined rate of flow of fluid is less than that of the fluid introduced into said cavity, and coacting lock means on said members to lock the same closed and operable to release the same for opening movement, said lock means including means to limit the relative opening movement of said members.

3. In a canister having a chamber in which a beverage producing ingredient is contained, a pair of members relatively movable from an open to a closed position to define said chamber therebetween, means to secure said members together for said relative movement, fluid inlet means communicating with said chamber to admit fluid thereinto, fluid outlet means communicating with said chamber to exhaust fluid therefrom, imperforate means in said chamber on which the beverage producing ingredient rests to space the same from said outlet means and to restrict the exhaust flow of fluid from said chamber to said fluid outlet means at a rate slower than that admitted into said chamber, and means to lock said members in their closed position and including means to limit their relative opening movement.

4. A canister comprising a plurality of members, means to connect said members for hinged opening and closing movement, said members being formed to define a chamber therebetween when the same are closed, said chamber being adapted to accommodate a beverage producing ingredient, a fluid inlet in one of said members to admit fluid into said chamber for infusion with said beverage producing ingredient contained therein, a fluid outlet in the other of said members to exhaust the infused fluid from said chamber, and imperforate plate means in said chamber on which said beverage producing ingredient rests to space and separate said ingredient from said fluid outlet, the periphery of said plate means resting against the walls of said other member defining said chamber and coacting therewith to define fluid seepage passageways to provide fluid communication between said chamber and said fluid outlet at a rate of flow less than that of the fluid admitted into said chamber.

5. A canister comprising top and bottom members defining a space therebetween for containing a beverage producing ingredient therein, inlet means in said top member to admit fluid under pressure into said space for infusion with the beverage producing ingredient contained therein, outlet means in said bottom member to exhaust from said space fluid infused with said ingredient, and imperforate means seated in said space to support said beverage producing ingredient and space the same from said outlet means, said imperforate plate coacting with the walls of said space to define therewith minute passageways through which the beverage infused fluid is caused to move under pressure to said outlet means at a rate less than said inlet means admits the same into said space.

6. A canister comprising top and bottom members movable to open and close a space defined therebetween and in which a beverage producing ingredient may be contained, fluid inlet means in said top member to admit fluid under pressure into said space for pressurized infusion with the ingredient contained therein, said inlet means including a plurality of nozzles arranged to spray fluid under pressure for dispersed infusion with the ingredient, fluid outlet means in the bottom member to exhaust the infused fluid from said space, imperforate plate means in said space seated against the defining walls thereof and spaced from said outlet to provide a seat for said beverage producing ingredient, said plate means cooperating with the walls of said space to define minute fluid exhaust passageways through which the infused fluid may exhaust from said space to said outlet means, the combined rate of flow of infused fluid being exhausted from said space through said passageways being slower than that of the fluid admitted under pressure into said space, and means operable to lock said members closed and to unlock said members to permit the same to open, said lock means including means to limit the opening of said members.

References Cited in the file of this patent

UNITED STATES PATENTS

| | | |
|---|---|---|
| 2,263,610 | Cain | Nov. 25, 1941 |
| 2,400,719 | Stackhouse | May 21, 1946 |
| 2,451,195 | Brown | Oct. 12, 1948 |
| 2,514,596 | Crossley et al. | July 11, 1950 |
| 2,589,783 | Crossley et al. | Mar. 18, 1952 |
| 2,761,200 | Arnett | Sept. 4, 1956 |